Jan. 25, 1938.  M. TIBBETTS  2,106,195
MOTOR VEHICLE
Filed May 1, 1933
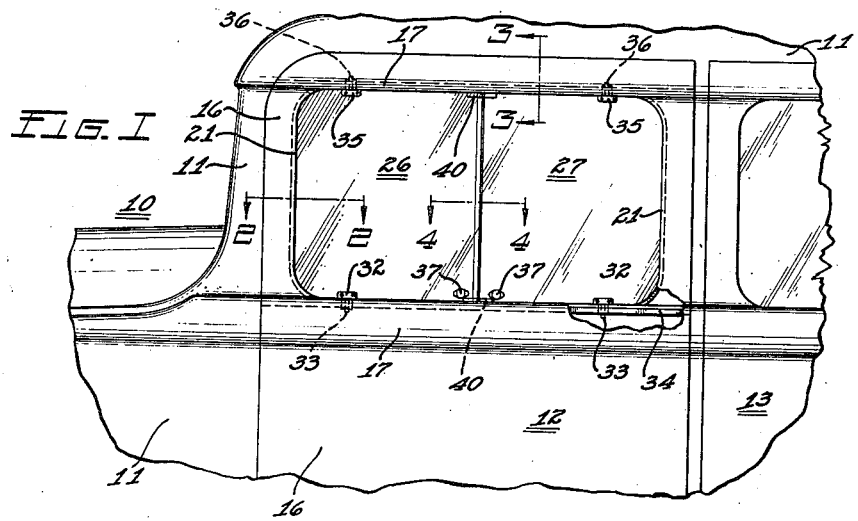
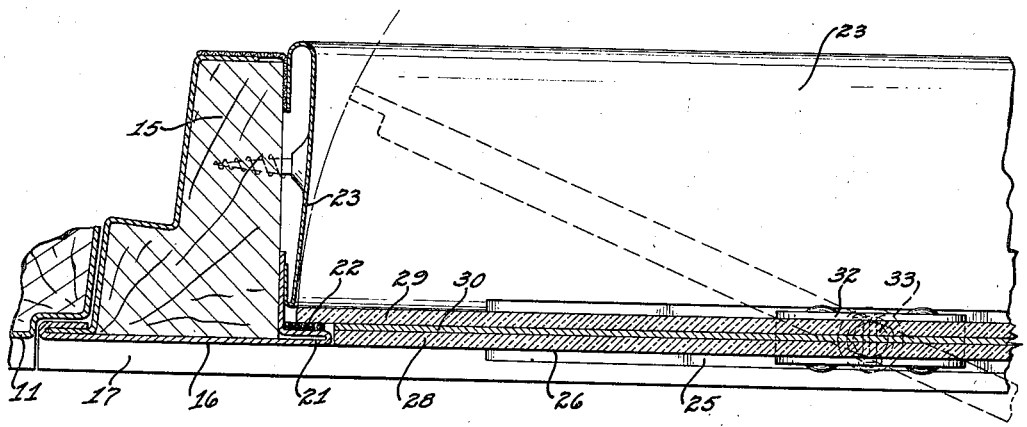
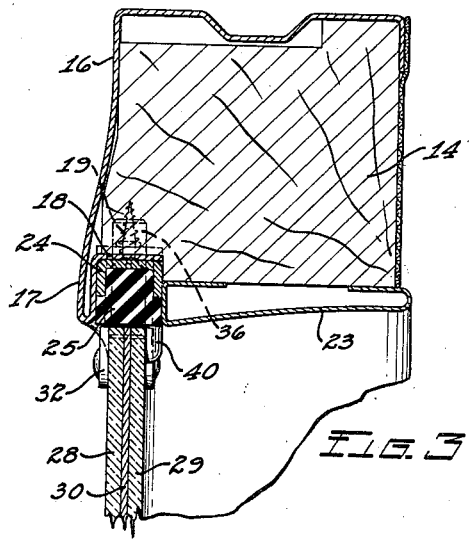
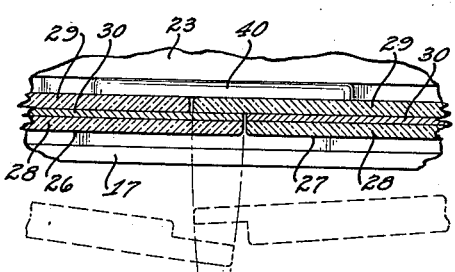
Inventor
Milton Tibbetts Patented Jan. 25, 1938

2,106,195

UNITED STATES PATENT OFFICE 2,106,195

MOTOR VEHICLE

Milton Tibbetts, Detroit, Mich., assignor to Packard Motor Car Company, Detroit, Mich., a corporation of Michigan Application May 1, 1933, Serial No. 668,785

9 Claims. (Cl. 296—44)

This invention relates to motor vehicles and more particularly to motor vehicle body construction.

In the present types of closed motor vehicle bodies, the window structures are arranged inwardly from the outer surface of the body panel so that recesses are formed in the sides of the body. During operation of vehicles having such bodies, air enters these recesses with the result that objectionable wind noises are caused and forward progress of the vehicle is impeded.

It is an object of the invention to overcome the above mentioned objectionable features through the provision of a body in which there are no side window recesses longitudinally of the vehicle.

Another object of the invention is to provide side windows for motor vehicle bodies which extend longitudinally in the stream line of the outer surface of the body panel.

A further object of the invention resides in a window construction in which two movable glass sections can be associated in a leak-proof relation at their junction without any interference with vision therethrough.

Still another object of the invention is to provide a glass window structure for motor vehicles which can be moved about a vertical axis to ventilate the interior of the vehicle body and which, in closed position, is in stream line relation with the body panel longitudinally of the vehicle.

Other objects of the invention will appear from the following description taken in connection with the drawing, which forms a part of this specification, and in which:

Fig. 1 is a side elevational view of a portion of a closed motor vehicle body having my invention incorporated therein;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Referring now to the drawing by characters of reference, 10 represents generally a closed type of motor vehicle body having side paneling 11 arranged to extend longitudinally in a stream line. Associated with each side of the body is a front door 12 and a rear door 13, the construction of such doors being such, when closed, that the panel portions thereof lie in the stream line of the adjacent panel of the body.

The front door includes a frame of the usual construction, the top, front and cross brace elements of which are indicated respectively at 14, 15 and 34, and an outer wall or panel 16. The window structure is arranged within an opening defined by the top, brace, front and rear frame elements of the door frame. The panel is turned inwardly over the outer edges of the outer frame elements and two parallel portions thereof adjacent the top and brace elements of the frame are pressed out to form longitudinally extending moldings 17. Interiorly of the moldings the panel is bent to form angular portions 18 which engage the under side of the top frame element and the top face of the brace element where they are secured by screws 19. A portion of the door panel at the front and rear of the window opening extends into the window opening and is bent to extend in a reverse direction to form flanges 21, the ends of such portions being bent to lie against the inner faces of the front and rear frame members of the door frame. Felt strips 22 are secured to the inside of the flanges 21 and finishing strips, indicated at 23, are secured to cover the inner faces of the top, brace, front and rear elements of the door frame around the window opening. Channel strips 24 are secured by the screws 19 to the top and brace elements of the door frame and in each of the channels is arranged a strip of rubber 25 forming gaskets.

Motor vehicle bodies of the closed type, are usually constructed so that the outer wall or panel extends in a stream line at least in a longitudinal direction and the panels of the door are in the stream line of the body panel. It is the usual practice to locate the door windows well inwardly of the door openings, thus forming recesses. Air entering such recesses impedes the forward progress of the vehicle as well as causing objectionable wind noises which increase in volume with the speed of the vehicle.

In order to overcome these objectionable features caused by the inward location of the window structures with respect to the side wall of a vehicle body, I propose to provide a window construction which is arranged so as to be flush with the side panel of the body at least in a longitudinal direction. The illustrated window structure is formed in two longitudinally arranged movable sections 26 and 27. These sections are preferably arranged to pivot about a vertical axis so that the interior of the body can be ventilated without causing drafts. However, they can be mounted to be moved vertically if desired. The window sections are each formed of sheet glass which is preferably of the well known non-shatterable type consisting of two layers 28 and 29 sealed together by an intermediate celluloid binder 30. The window sections are formed to overlap at their junction when closed and they are of such a size that the top and bottom edges will engage the gaskets 25. The front and rear sections of the window structure are formed so that, when closed, the outer layers of glass fit the opening between the flanges 21 with the rear layer of glass extending beyond the flanges so that engagement with the felt strips 22 can be had. This arrangement of the window structure, beside forming a leak-proof joint around the window opening, also permits the outer surface of the window sections to extend in the stream line of the outer surface of the body paneling.

The window sections 26 and 27 are formed with their adjacent edges of a character such that they can overlap to preserve the stream line effect of the window structure. The non-shatterable type of glass can be advantageously utilized to stagger the two layers in each section. The rear layer of the front window section terminates short of the front layer while the rear layer of the rear window sections extends forwardly of the front layer and, in this manner, the glass sections can overlap to provide a sealed joint without the use of a sealing strip member which would obscure the vision.

Each section of the window structure has a bracket 32 secured to the lower edge thereof and from these brackets there extends a pintle 33 which projects into an opening formed in the cross frame element 34. Aligned vertically with the brackets 32 are similar brackets 35 carrying pintles 36 which extend into recesses in the top frame element. The window sections can be swung, as shown in dotted lines in Figs. 2 and 4, about a vertical axis on these pintles by the direct application of force thereto and, in order to conveniently apply such force, a knob 37 is secured to each of the window sections. Movement of the windows about their axes is limited in one direction by the flanges 21 and abutments 40 projecting from the gaskets. When the rear layer of the window sections abut the felt on the flanges 21, they will be in longitudinal alignment and the window sections will be in the stream line of the side panel of the body. It will be understood that the pintle connection can be of a friction type in order to maintain the window sections in any position of angular adjustment in which they are placed.

With the window construction herein described, I have eliminated window recesses longitudinally of the vehicle and have improved the stream line of a closed motor vehicle body. By means of this construction, I have eliminated the wind noises usually caused by window recesses and I also enable a vehicle to make a higher speed because wind resistance is reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle body, a side panel having a flange defining an opening therein, and a window structure having the outer portion formed to fit in and close the panel opening with the exterior face flush in a longitudinal direction with the outer surface of the panel and the inner portion overlapping the interior end faces of the panel flange.

2. In a motor vehicle body, a side panel having a window opening therein, and a window structure in the opening comprising two longitudinally arranged sections, the adjacent edges of said sections being formed to overlap and form a joint of the same thickness as the main portion of each window section, and the front and rear edges of the window structure overlapping the interior face of the adjacent panel and the exterior faces of the sections being flush with the exterior face of the panel in a direction longitudinally of the vehicle.

3. In a motor vehicle, a stream line body side panel having a window opening therein, and a window structure in the opening comprised of two longitudinally extending sections each having layers of sheet glass bound together by celluloid, the total length of the inner and outer layers being different whereby the outer layers of the sections can be disposed within the opening with the outer face in the stream line of the panel and with the ends of the inner layers of the sections overlapping the adjacent inner edge portions of the panel.

4. In a motor vehicle, the combination of a panel having a window opening therein, and an adjustable transparent window structure associated with the panel to open and close the opening, the outer portion of the window structure being formed to fit into the panel opening with the exterior face flush with the exterior surface of the panel and the inner end portions of the window structure being formed to overlap the inner surface of the panel at opposite ends of the opening.

5. In a motor vehicle, the combination of a frame structure having a window opening therein, a frame panel having flanges extending into the ends of the opening, window sections in the frame opening, and pivot means for the window sections carried by the frame structure, said window sections having outer portions adapted to close the opening in a flush relation with the outer surface of the panel longitudinally of the vehicle when in aligned relation and having inner portions adapted to overlap each other and the inner faces of the flanges when in aligned relation.

6. In a motor vehicle, the combination of a frame structure having a window opening therein, a frame panel having flanges extending into the ends of the opening, and a window structure comprising sections formed of layers of glass, said sections having the layers thereof arranged in overlapping relation longitudinally of the vehicle, the adjacent edges of the sections when aligned overlapping and the relative layers of the sections overlapping the inner faces of the flanges when the sections are in aligned relation.

7. In a vehicle body, the combination of a side panel having a window opening therein, and a glass structure in the opening with its forward edge making an overlapping joint with the panel at the forward edge of said opening, said forward edges of panel opening and glass structure being so formed that the outer surfaces thereof are in the same plane and wind noises at the joint are eliminated.

8. In a vehicle body, the combination of a side panel having a window opening therein, and a glass structure in the opening with its forward and rear edges making overlapping joints with the panel at the respective forward and rear edges of said opening, said edges of the panel opening and glass structure being so formed that the outer surfaces of the panel and the structure at said joints are in the same plane and wind noises at the joints are eliminated.

9. In a vehicle body, the combination of a side panel having a window opening therein, and a glass structure in the opening mounted so that in one position it closes the opening and in another position it partly or wholly opens the opening, said glass structure being arranged when in closed position with its forward edge making an overlapping joint with the panel at the forward edge of said opening, said forward edges of panel opening and glass structure being so formed that the outer surfaces thereof are in the same plane and wind noises at the joint are eliminated.

MILTON TIBBETTS.